(12) United States Patent
Nagano et al.

(10) Patent No.: US 11,580,674 B2
(45) Date of Patent: Feb. 14, 2023

(54) INFORMATION DISTRIBUTION APPARATUS, INFORMATION GENERATION METHOD, AND INFORMATION GENERATION PROGRAM

(71) Applicant: JVCKENWOOD Corporation, Yokohama (JP)

(72) Inventors: Masayuki Nagano, Yokohama (JP); Tatsumi Naganuma, Yokohama (JP); Satoru Hirose, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 281 days.

(21) Appl. No.: 16/996,958

(22) Filed: Aug. 19, 2020

(65) Prior Publication Data

US 2021/0090303 A1    Mar. 25, 2021

(30) Foreign Application Priority Data

Sep. 25, 2019 (JP) .............................. JP2019-174269

(51) Int. Cl.
*G06T 11/00* (2006.01)
*G06Q 30/0601* (2023.01)

(52) U.S. Cl.
CPC .......... *G06T 11/00* (2013.01); *G06Q 30/0643* (2013.01)

(58) Field of Classification Search
CPC ...... G06T 11/00; G06T 11/60; G06Q 30/0643
USPC ........................................................ 382/103
See application file for complete search history.

(56) References Cited

U.S. PATENT DOCUMENTS

| 2013/0113829 | A1  | 5/2013  | Suzuki |
|---|---|---|---|
| 2015/0339860 | A1* | 11/2015 | Endo ..................... G06T 19/006 345/633 |
| 2017/0011452 | A1* | 1/2017  | Beckham ............... G06T 19/006 |
| 2017/0228872 | A1* | 8/2017  | An ............................ G06T 7/12 |
| 2021/0065286 | A1* | 3/2021  | Woo ........................ G06V 40/28 |

FOREIGN PATENT DOCUMENTS

JP     5845830     1/2016

* cited by examiner

*Primary Examiner* — Neil R McLean

(74) *Attorney, Agent, or Firm* — Amin, Turocy & Watson, LLP

(57) ABSTRACT

An information distribution apparatus includes an imaging unit configured to capture a captured image including a specific object, an object image acquisition unit configured to acquire an object image of the specific object from the captured image, and a try-on data generation unit configured to generate try-on data based on a registration avatar in a virtual space and the object image.

6 Claims, 11 Drawing Sheets

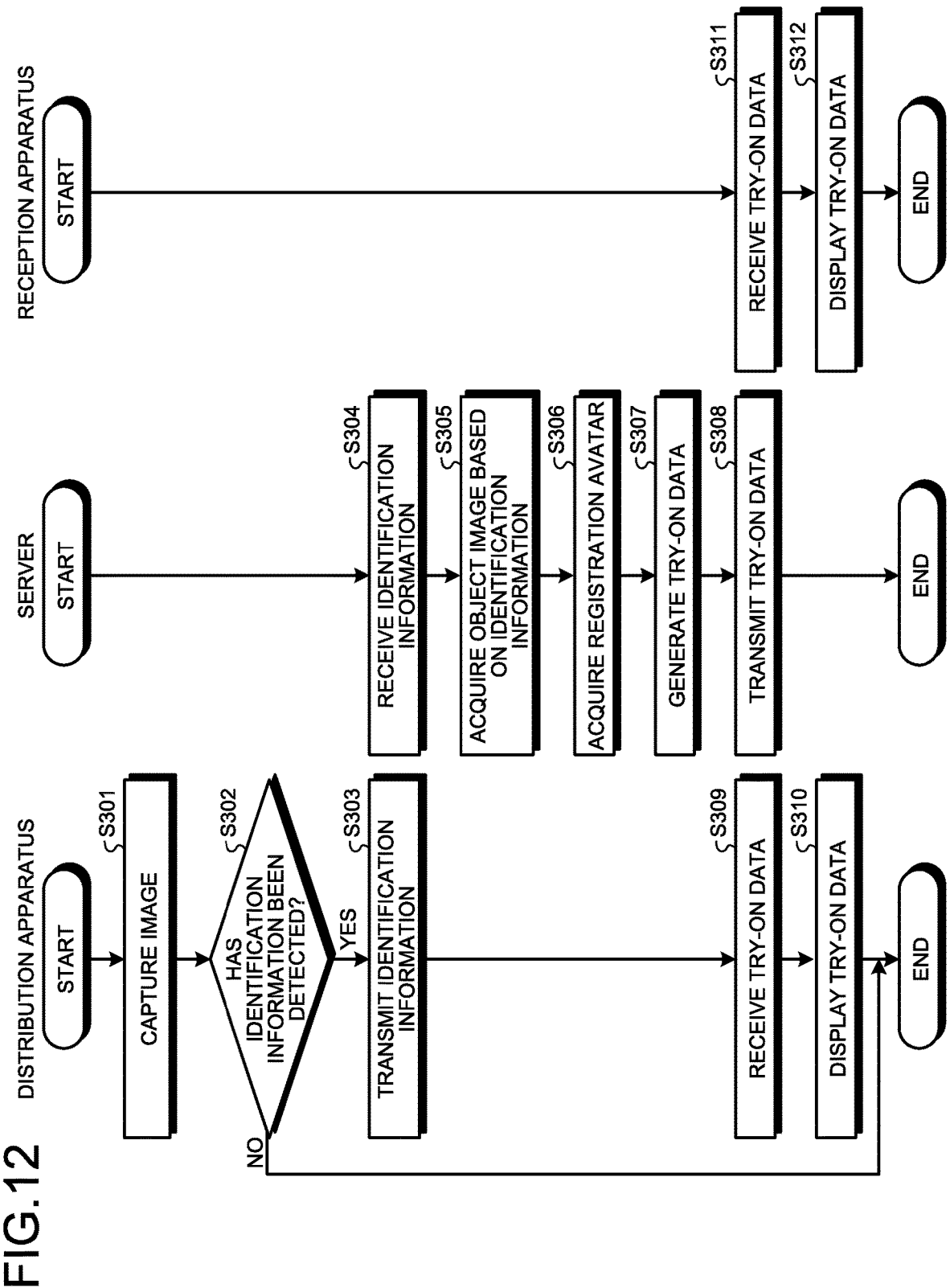

INFORMATION DISTRIBUTION APPARATUS, INFORMATION GENERATION METHOD, AND INFORMATION GENERATION PROGRAM

CROSS-REFERENCE TO RELATED APPLICATIONS

This application claims priority from Japanese Application No. 2019-174269, filed on Sep. 25, 2019, the contents of which are incorporated by reference herein in its entirety.

BACKGROUND

1. Technical Field

The present disclosure relates to an information distribution apparatus, an information generation method, and an information generation program.

2. Description of the Related Art

As disclosed in JP 5845830 B2, for example, a system is known, which enables a plurality of terminal devices to communicate with each other so that users can do shopping while interacting with the terminal devices in a virtual space in real time.

The system as described above is premised on, for example, a case where a user tries clothes on himself/herself. Meanwhile, there is a demand for a system that enables a user to try clothes on a third person other than himself/herself.

SUMMARY

It is an object of the present disclosure to at least partially solve the problems in the conventional technology.

According to an aspect, an information distribution apparatus includes an imaging unit configured to capture a captured image including a specific object, an object image acquisition unit configured to acquire an object image of the specific object from the captured image, and a try-on data generation unit configured to generate try-on data based on a registration avatar in a virtual space and the object image.

According to another aspect, an information generation method includes capturing a captured image including a specific object, acquiring an object image of the specific object from the captured image, generating try-on data based on a registration avatar in a virtual space and the object image, and transmitting the generated try-on data to an information reception apparatus.

According to another aspect, a non-transitory computer-readable storage medium storing an information generation program causes a computer to execute a method that includes capturing a captured image including a specific object, acquiring an object image of the specific object from the captured image, and generating try-on data based on a registration avatar in a virtual space and the object image.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 12 is a flowchart illustrating an example of the operation of the information distribution system.

DETAILED DESCRIPTION OF THE PREFERRED EMBODIMENTS

Embodiments of the present disclosure will be described below with reference to the drawings. These embodiments do not limit the present disclosure. Components in the following embodiments include ones that can be replaced by those skilled in the art and are easy or substantially the same ones.

First Embodiment

Figure 1:
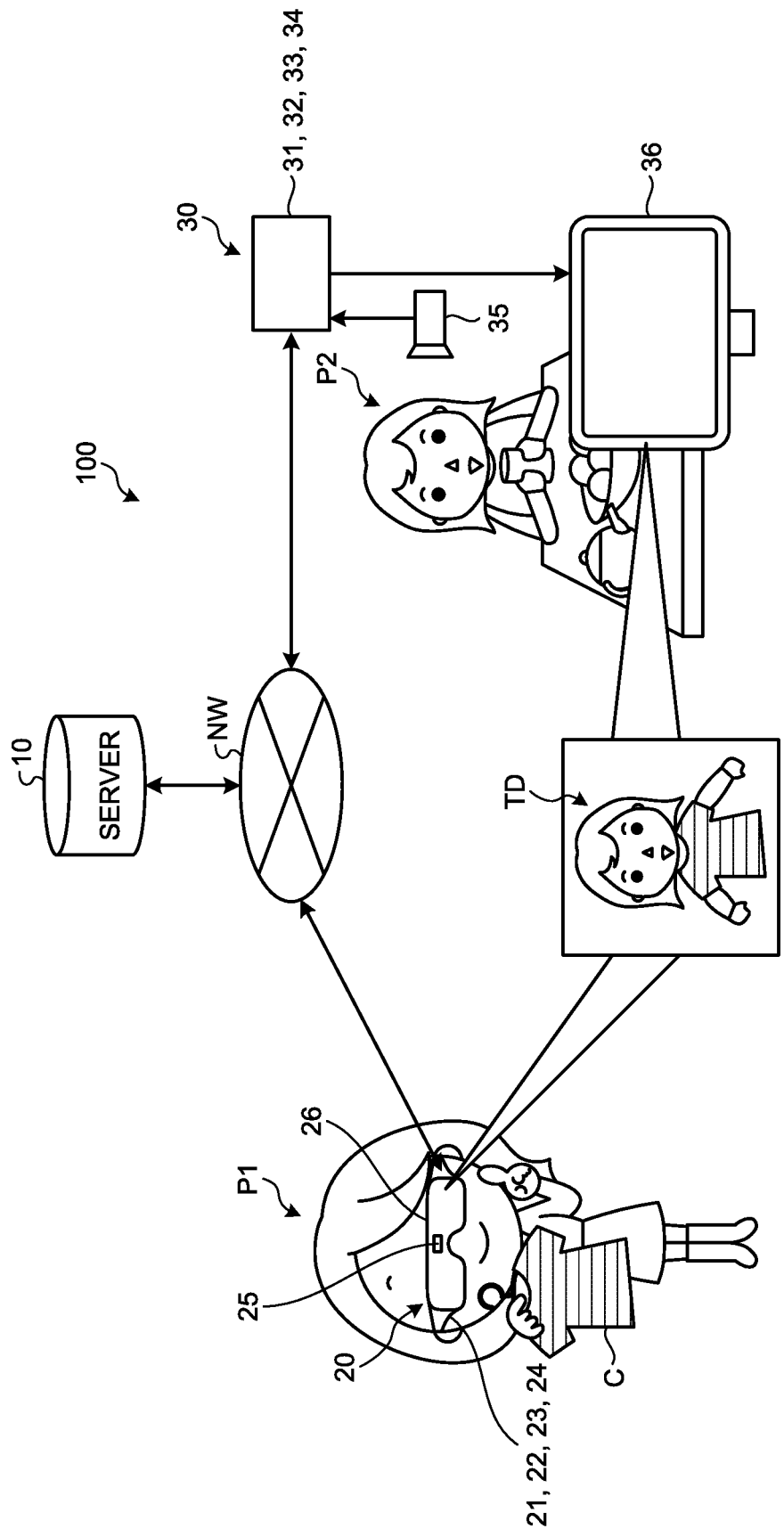
FIG. 1 is a diagram schematically illustrating an example of an information distribution system according to a first embodiment.

FIG. 1 is a diagram schematically illustrating an example of an information distribution system 100 according to a first embodiment. As illustrated in FIG. 1, the information distribution system 100 includes a server 10, a distribution apparatus (information distribution apparatus) 20, and a reception apparatus (information reception apparatus) 30. The distribution apparatus 20, the server 10, and the reception apparatus 30 are capable of communicating with each other via a network NW. The distribution apparatus 20 and the reception apparatus 30 are located at distant positions from each other. For example, one of the distribution apparatus 20 and the reception apparatus 30 is located at a distant location from the other one. The information distribution system 100 is, for example, capable of mutually communicating information between distant locations.

Figure 2:
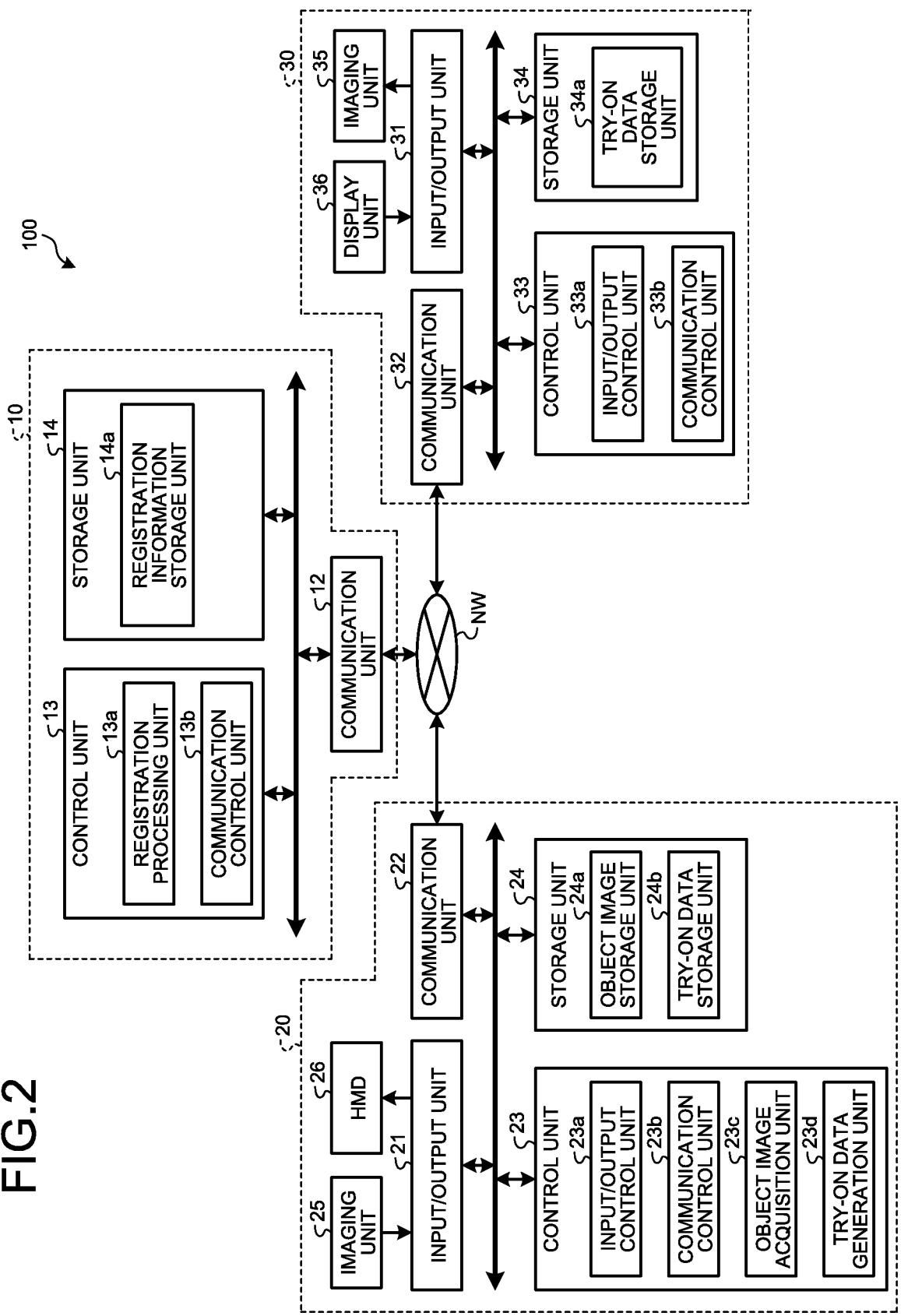
FIG. 2 is a functional block diagram illustrating an example of the information distribution system.

FIG. 2 is a functional block diagram illustrating an example of the information distribution system 100. As illustrated in FIG. 2, the server 10 includes a communication unit 12, a control unit 13, and a storage unit 14.

The communication unit 12 is, for example, capable of communicating information with the distribution apparatus 20 and the reception apparatus 30 via the network NW. The communication unit 12 may perform either wired or wireless communication.

The control unit 13 includes a processor, such as a central processing unit (CPU), and a memory, such as a random access memory (RAM) or a read only memory (ROM). The control unit 13 includes a registration processing unit 13a and a communication control unit 13b.

The registration processing unit 13a performs a registration process with respect to a receiver. Examples of the registration process include storing identification information and a registration avatar of the receiver which are transmitted from the reception apparatus 30 in the storage unit 14.

The communication control unit 13b controls communication with the distribution apparatus 20 and the reception apparatus 30. The communication control unit 13b causes the communication unit 12 to receive information transmitted from the distribution apparatus 20 and the reception apparatus 30. The communication control unit 13b also causes the communication unit 12 to transmit information to the distribution apparatus 20 and the reception apparatus 30.

The storage unit 14 stores a variety of information. The storage unit 14 includes a storage, such as a hard disk drive or a solid state drive. An external storage medium, such as a removal disk, may be used as the storage unit 14. The storage unit 14 includes a registration information storage unit 14a. The registration information storage unit 14a stores registration information about the receiver. The registration information includes identification information for identifying the receiver and the registration avatar of the receiver in a virtual space. The registration avatar is, for example, three-dimensionally present in the virtual space.

The distribution apparatus 20 includes an input/output unit 21, a communication unit 22, a control unit 23, a storage unit 24, an imaging unit 25, and a head mount display (HMD) 26.

The input/output unit 21 is, for example, connected to the imaging unit 25 and the HMD 26. The imaging unit 25 captures a captured image. The captured image captured by the imaging unit 25 is input to the input/output unit 21. The input/output unit 21 outputs predetermined display information to the HMD 26.

The communication unit 22 is, for example, capable of communicating information with the server 10 via the network NW. The communication unit 22 may perform either wired or wireless communication.

The control unit 23 includes a processor, such as a CPU, and a memory, such as a RAM or a ROM. The control unit 23 includes an input/output control unit 23a, a communication control unit 23b, an object image acquisition unit 23c, and a try-on data generation unit 23d.

The input/output control unit 23a acquires the captured image input to the input/output unit 21. The input/output control unit 23a causes the input/output unit 21 to output display information to be displayed on the HMD 26.

The communication control unit 23b controls transmission and reception of information in the communication unit 22. The communication control unit 23b acquires information received by the communication unit 22, for example, the registration avatar (described below). The communication control unit 23b causes the communication unit 22 to transmit the captured image captured by the imaging unit 25 and try-on data generated by the try-on data generation unit 23d (described below).

The object image acquisition unit 23c acquires an object image of a specific object from the captured image. Hereinbelow, a try-on object will be described as an example of the specific object. The object image acquisition unit 23c, for example, acquires the object image based on the movement of the arms of a distributor who holds the try-on object and captures an image thereof.

The object image acquisition unit 23c stores the acquired object image in the storage unit 24.

The try-on data generation unit 23d generates try-on data based on the registration avatar in a virtual space registered on the server 10 and the object image acquired by the object image acquisition unit 23c. The try-on data generation unit 23d requests the server 10 to transmit the registration avatar. When the registration avatar is transmitted from the server 10, the communication control unit 23b acquires the transmitted registration avatar. The try-on data generation unit 23d is capable of generating a try-on avatar, which is try-on data as an avatar, by superimposing the object image on the registration avatar. Further, the try-on data generation unit 23d generates a registration image based on the registration avatar and places the registration image at a part corresponding to the object image in the captured image in real time to generate the captured image including the registration image as try-on data. The registration image based on the registration avatar is, for example, an image of a part of the registration avatar, such as the head, body, hand, or foot of the registration avatar. The try-on data generation unit 23d stores the generated try-on data in the storage unit 24.

The storage unit 24 stores a variety of information. The storage unit 24 includes a storage, such as a hard disk drive or a solid state drive. An external storage medium, such as a removal disk, may be used as the storage unit 24. The storage unit 24 includes an object image storage unit 24a and a try-on data storage unit 24b. The object image storage unit 24a stores the object image acquired by the object image acquisition unit 23c. The try-on data storage unit 24b stores the try-on data generated by the try-on data generation unit 23d. When the captured image including the registration image is generated as the try-on data, the captured image may not be stored in the try-on data storage unit 24b. The storage unit 24 also stores an information generation program which causes a computer to execute a process for capturing a captured image IM including a try-on object C as a specific object, a process for acquiring an object image Q of the try-on object C from the captured image IM, and a process for generating try-on data TD based on the registration avatar and the acquired object image Q.

The reception apparatus 30 includes an input/output unit 31, a communication unit 32, a control unit 33, a storage unit 34, an imaging unit 35, and a display unit 36. The reception apparatus 30 includes an input device (not illustrated), such as a keyboard, a mouse, a switch, or a touch panel.

The input/output unit 31 is, for example, connected to the imaging unit 35 and the display unit 36. A captured image captured by the imaging unit 35 is input to the input/output unit 31. The input/output unit 31 outputs predetermined display information to the display unit 36.

The communication unit 32 is, for example, capable of communicating information with the server 10 via the network NW. The communication unit 32 may perform either wired or wireless communication.

The control unit 33 includes a processor, such as a CPU, and a memory, such as a RAM or a ROM. The control unit 33 includes an input/output control unit 33a and a communication control unit 33b.

The input/output control unit 33a acquires the captured image input to the input/output unit 31. The input/output control unit 33a causes the input/output unit 31 to output display information to be displayed on the display unit 36. The communication control unit 33b acquires the try-on data transmitted from the distribution apparatus 20 and received by the communication unit 32, and stores the acquired try-on data in the storage unit 34. The communication control unit 33b causes the communication unit 32 to transmit predetermined information.

The storage unit 34 stores a variety of information. The storage unit 34 includes a storage, such as a hard disk drive or a solid state drive. An external storage medium, such as a removal disk, may be used as the storage unit 34. The storage unit 34 includes a try-on data storage unit 34a. The try-on data storage unit 34a stores the try-on data received by the communication unit 32.

The imaging unit 35 captures an image of the receiver for generating the registration avatar. The display unit 36 is capable of displaying the try-on data. The display unit 36 may be a flat panel display, such as a liquid crystal display, or an HMD.

Next, an example of the operation of the information distribution system 100 configured as described above will be described. In the present embodiment, one of a distributor P1 and a receiver P2 is present at a distant location from the other. For example, the distributor P1 is present at a position where the distributor P1 can go to a real shop that sells clothes. On the other hand, the receiver P2 is present at a distant location from the real shop, and it is thus difficult for the receiver P2 to go to the real shop. The present embodiment describes, as an example, a case where the distributor P1 goes to the real shop and selects a clothing item preferred by the receiver P2 under such a condition.

For example, registration information items of the distributor P1 and the receiver P2 are stored in the registration information storage unit 14a of the server 10 so that they both know the other's appearance. Here, a case where the registration information is stored in the registration information storage unit 14a will be described. Hereinbelow, a case where the registration information of the receiver P2 is stored will be described as an example. However, the same description can apply to a case where the registration information of the distributor P1 is stored.

First, the creation of an account is started in the server 10. For example, user identification information that enables identification of the receiver P2 is input through, the input device (not illustrated) or the like of the reception apparatus 30. Next, the imaging unit 35 captures an image of the appearance of the receiver P2. At this time, the image includes a face image of the receiver P2. Further, the image preferably includes information of the whole body of the receiver P2. Further, the image preferably includes information of the front, back, right and left sides of the receiver P2. Body information, such as the length of the arm, the length of the leg, the height, the weight, the waist circumference, or the girth of the head, of the receiver P2, may be additionally input as a numerical value through the input device (not illustrated). In the server 10, the registration avatar is generated based on the captured image, and the registration avatar associated with the user identification information is stored in the registration information storage unit 14a.

In such a state, the distributor P1 carrying the distribution apparatus 20 goes to a predetermined real shop, and selects a clothing item (try-on object) that may be preferred by the receiver P2. At this time, the distributor P1 captures an image of the state of selecting the try-on object using the imaging unit 25. For example, the distributor P1 wearing the HMD 26 captures an image of the try-on object using the imaging unit 25 fixed to the HMD. The captured image captured by the imaging unit 25 is analyzed in real time by the object image acquisition unit 23c of the control unit 23 and transmitted from the communication unit 22 to the server 10 via the network NW by the communication control unit 23b. Further, the captured image is transmitted from the communication unit 12 to the reception apparatus 30 of the receiver P2 via the network NW by the communication control unit 13b of the server 10.

In the reception apparatus 30, the communication unit 32 receives the captured image. The communication control unit 33b acquires the received captured image. The input/output control unit 33a causes the input/output unit 31 to output the acquired captured image to the display unit 36. The display unit 36 displays the captured image. The receiver P2 can share the state of selecting the try-on object with the distributor P1 by watching the captured image displayed on the display unit 36.

Figure 3:
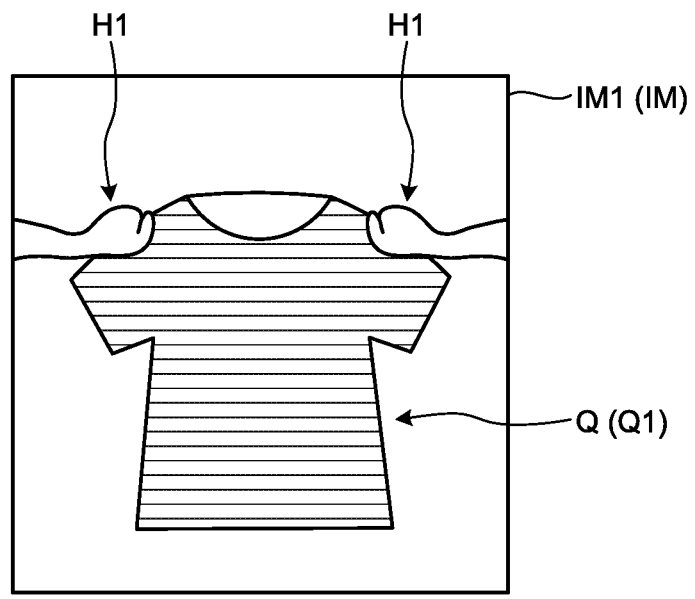
FIG. 3 is a diagram illustrating an example of a captured image of a try-on object.

When the distributor P1 has found the try-on object C which may be preferred by the receiver P2, the distributor P1 captures an image of the try-on object C held by the distributor P1 using the imaging unit 25. At this time, the movement of the hands of the distributor P1 is included in the image. The distributor P1 performs, for example, a first action of raising the try-on object C held with both hands to a predetermined height and spreading the hands out. FIG. 3 illustrates an example of the captured image of the try-on object C. As illustrated in FIG. 3, a captured image IM1 includes hands H1 of the distributor P1 holding the try-on object C, the try-on object C being raised to the eye level and spread out.

When the object image acquisition unit 23c has detected, for example, a scene in which the hands H1 of the distributor P1 are present at positions higher than the predetermined height, and the try-on object C is held with the hands H1 with a predetermined distance or larger between the hands H1 in the captured image, the object image acquisition unit 23c can determine that the first action has been performed. When the object image acquisition unit 23c has detected the scene in which the distributor P1 performs the first action in the captured image, the object image acquisition unit 23c acquires an image of the try-on object C held by the distributor P1 as an object image. The object image acquisition unit 23c determines a range of the try-on object C by, for example, image processing. The object image acquisition unit 23c stores the acquired object image in the object image storage unit 24a of the storage unit 24.

Figure 4:
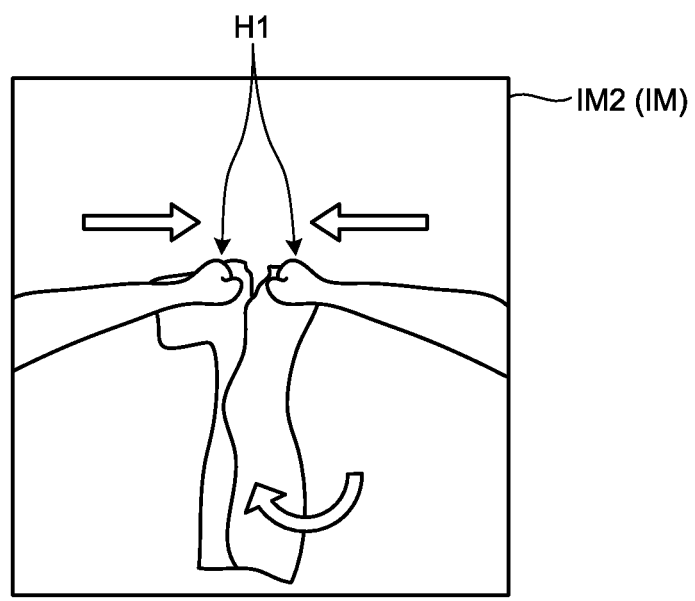
FIG. 4 is a diagram illustrating an example of the captured image of the try-on object.
Figure 5:
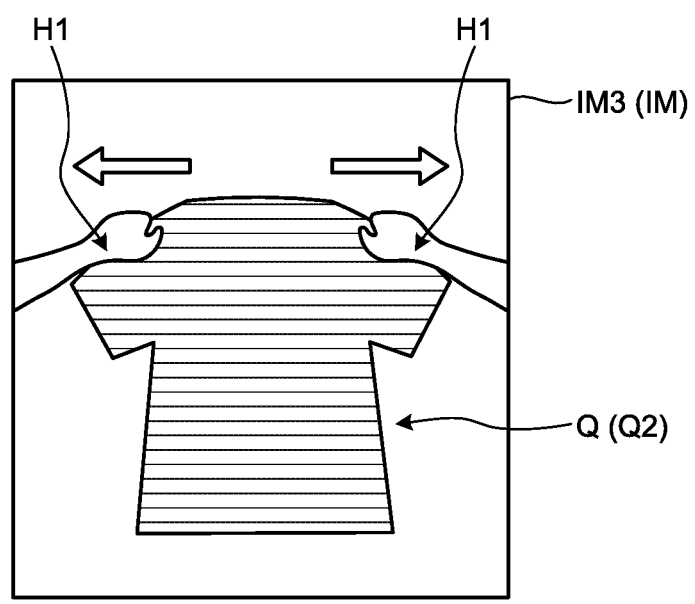
FIG. 5 is a diagram illustrating an example of the captured image of the try-on object.

The distributor P1 further performs, for example, a second action of moving the hands in the spread state by the first action close to each other, turning over the try-on object C so that the back side of the try-on object C can be seen, and spreading the hands out again. FIGS. 4 and 5 illustrate examples of the captured image of the try-on object C. A captured image IM2 illustrated in FIG. 4 is an example of a scene in which the distributor P1 moves the hands close to each other so as to turn over the try-on object C. A captured image IM3 illustrated in FIG. 5 is an example of a scene in which the distributor P1 spreads the hands out again with the back side of the try-on object C facing the front after turning over the try-on object C.

When the object image acquisition unit 23c has detected, for example, a scene in which the hands of the distributor P1 are moved close to each other once and moved away from each other again after the first action, the object image acquisition unit 23c can determine that the second action has been performed. When the object image acquisition unit 23c has detected the scene in which the distributor P1 performs the second action in the captured image, the object image acquisition unit 23c acquires an image of the back side of the try-on object C held by the distributor P1 as a new object image. The object image acquisition unit 23c stores the acquired object image in the object image storage unit 24a of the storage unit 24.

When the try-on data generation unit 23*d* has detected that the object image has been stored in the object image storage unit 24*a*, the try-on data generation unit 23*d* requests the server 10 to transmit the registration avatar in the registration information of the receiver P2. The server 10 transmits the registration avatar of the receiver P2 from the communication unit 12 in response to the request. The communication unit 22 of the distribution apparatus 20 receives the transmitted registration avatar. The communication control unit 23*b* acquires the received registration avatar.

The try-on data generation unit 23*d* generates try-on data of the receiver P2 based on the acquired registration avatar and the object image stored in the object image storage unit 24*a*. The try-on data is data to be displayed on the display unit 36 of the reception apparatus 30, the data representing the appearance of the receiver P2 trying on the try-on object C.

Figure 6:
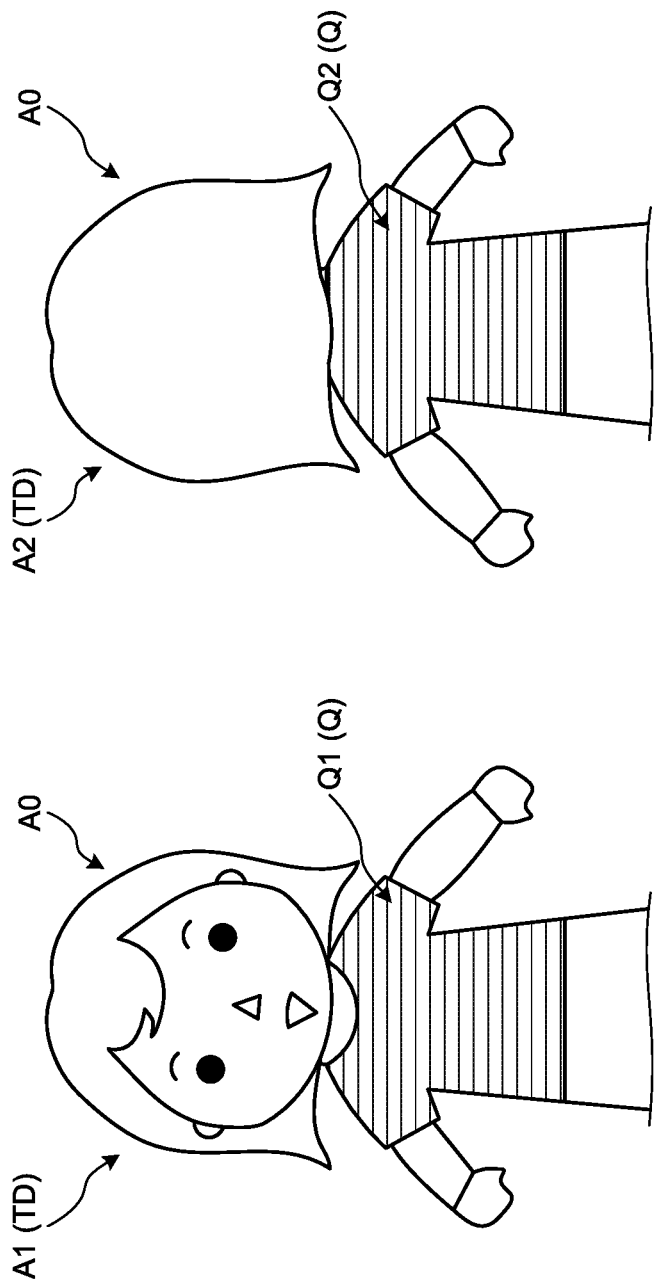
FIG. 6 is a diagram illustrating an example of the captured image of the try-on object.

The try-on data generation unit 23*d* is capable of generating a try-on avatar by superimposing the object image on the registration avatar. The try-on avatar is try-on data as an avatar. The try-on data generation unit 23*d*, for example, superimposes the object image including the front of the try-on object C on the front side of the registration avatar, and superimposes the object image including the back of the try-on object C on the back side of the registration avatar. FIG. 6 is a diagram illustrating an example of the try-on avatar. A try-on avatar A1 illustrated in FIG. 6 represents a state in which an object image Q1 of the front side of the try-on object C is superimposed on the front side of a registration avatar A0. A try-on avatar A2 illustrated in FIG. 6 represents a state in which an object image Q2 of the back side of the try-on object C is superimposed on the back side of the registration avatar A0. The communication control unit 23*b* causes the communication unit 22 to transmit the generated try-on avatars A1, A2 to the server 10 via the network NW. In the server 10, the communication unit 12 receives the try-on avatars A1, A2. The communication control unit 13*b* causes the communication unit 12 to transmit the received try-on avatars A1, A2 to the reception apparatus 30 via the network NW.

In the reception apparatus 30, the communication unit 32 receives the try-on avatars. The communication control unit 33*b* acquires the received try-on avatars. The input/output control unit 33*a* causes the input/output unit 31 to output the acquired try-on avatars to the display unit 36. The display unit 36 displays the try-on avatars. More specifically, the registration avatar of the receiver P2 with the object image of the try-on object C superimposed thereon is displayed on the display unit 36.

Figure 7:
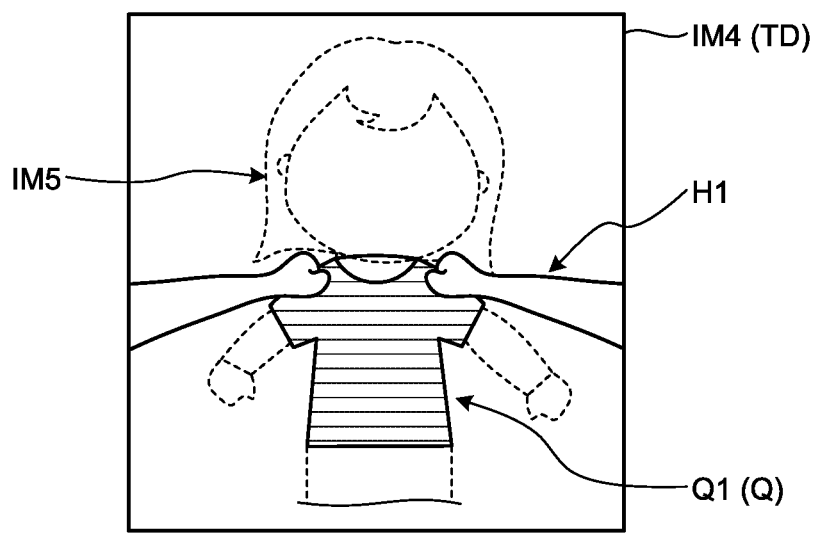
FIG. 7 is a diagram illustrating an example of a captured image including a registration image.

The try-on data generation unit 23*d* is capable of generating try-on data as a captured image by generating a registration image based on the registration avatar and placing the registration image at a part corresponding to the object image in the captured image in real time. FIG. 7 is a diagram illustrating an example of the captured image including the registration image. A captured image IM4 illustrated in FIG. 7 includes a registration image IM5 placed at a position corresponding to the object image Q of the try-on object C held by the distributor P1. The communication control unit 23*b* causes the communication unit 22 to transmit the captured image IM4 including the registration image IM5 to the server 10 via the network NW. In the server 10, the communication unit 12 receives the captured image IM4. The communication control unit 13*b* causes the communication unit 12 to transmit the received captured image IM4 to the reception apparatus 30 via the network NW.

In this case, in the reception apparatus 30, the communication unit 32 receives the captured image IM4. The communication control unit 33*b* acquires the received captured image IM4. The input/output control unit 33*a* causes the input/output unit 31 to output the acquired captured image IM4 to the display unit 36. The display unit 36 is capable of displaying try-on data by displaying the captured image IM4. More specifically, the captured image IM4 including the registration image IM5 of the receiver P2 placed corresponding to the object image Q of the try-on object C is displayed on the display unit 36.

In this manner, the receiver P2 can check a try-on state by watching the try-on data TD displayed on the display unit 36 even when the receiver P2 is present at a distant location from the shop that sells the try-on object C. Further, when the try-on avatar is generated as the try-on data, the receiver P2 can check a try-on state from a preferred side, for example, the front side or the back side. When the try-on data is generated as the captured image, the receiver P2 can check a try-on state while watching the captured image captured by the distributor P1 in real time.

Figure 8:
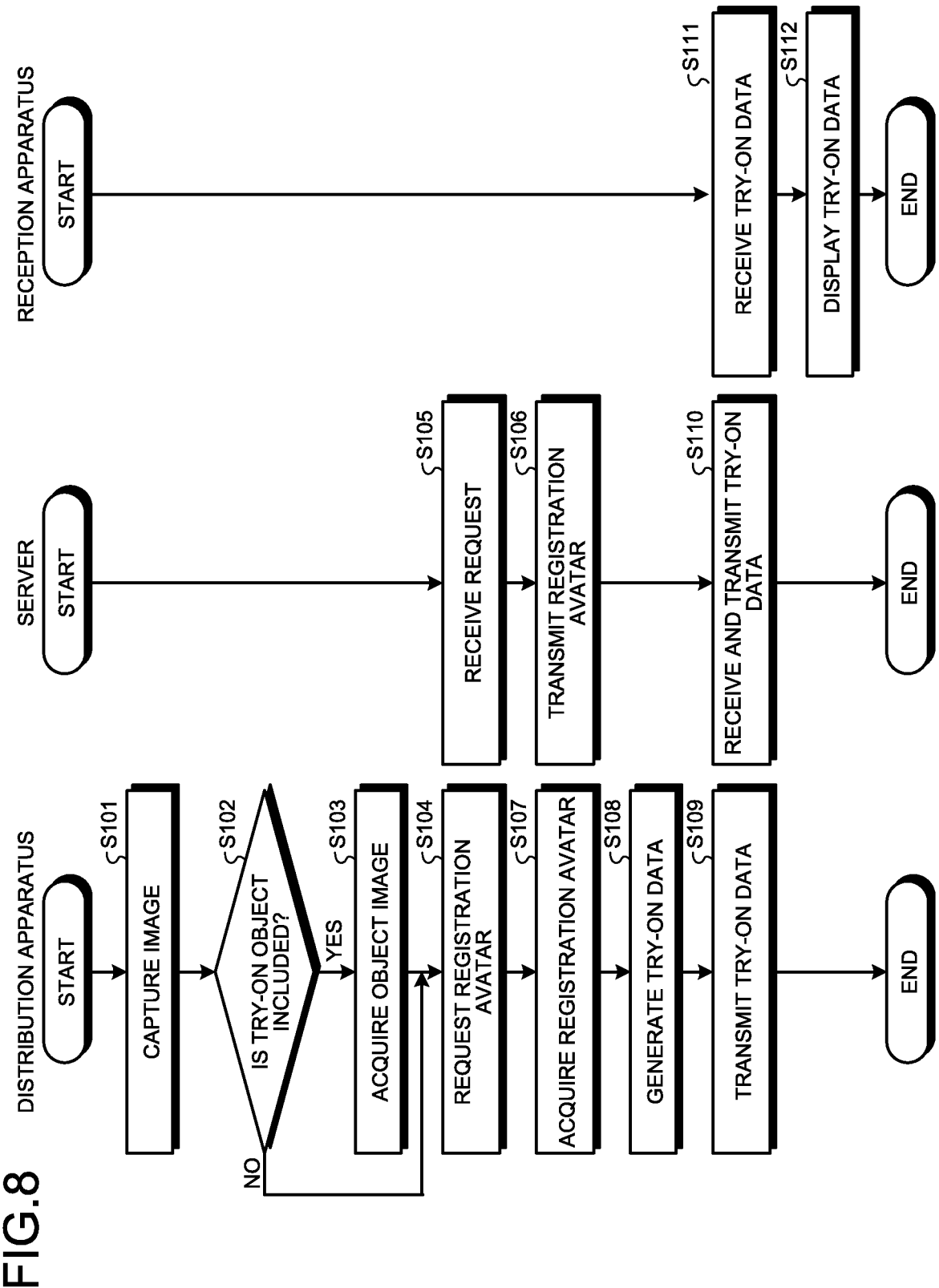
FIG. 8 is a flowchart illustrating an example of the operation of the information distribution system.

FIG. 8 is a flowchart illustrating an example of the operation of the information distribution system 100. As illustrated in FIG. 8, when the distributor P1 captures an image of a try-on object using the imaging unit 25 (Step S101), the object image acquisition unit 23*c* analyzes whether the captured image captured by the imaging unit 25 includes the try-on object such as the try-on object C in real time (Step S102). In Step S102, the object image acquisition unit 23*c*, for example, analyzes whether the captured image includes the scenes of the first action and the second action by the distributor P1. When the try-on object has been detected (Yes in Step S102), the object image acquisition unit 23*c* acquires an object image of the try-on object (Step S103), and stores the acquired object image in the object image storage unit 24*a* of the storage unit 24.

When the try-on data generation unit 23*d* has detected that the object image has been stored in the object image storage unit 24*a*, the try-on data generation unit 23*d* requests the server 10 to transmit a registration avatar (Step S104). When the server 10 has received the request of Step S104 (Step S105), the server 10 transmits the registration avatar to the distribution apparatus 20 (Step S106). The communication control unit 23*b* acquires the registration avatar transmitted from the server 10 (Step S107). The try-on data generation unit 23*d* generates try-on data of the receiver P2 based on the acquired registration avatar and the object image stored in the object image storage unit 24*a* (Step S108). In Step S108, the try-on data generation unit 23*d* can generate a try-on avatar, for example, by superimposing the object image on the registration avatar. Further, the try-on data generation unit 23*d* can generate a captured image including a registration image as try-on data by generating the registration image of the receiver P2 based on the acquired registration avatar and placing the registration image at a part corresponding to the object image in the captured image. The communication control unit 23*b* causes the communication unit 22 to transmit the generated try-on data to the server 10 via the network NW (Step S109). In the server 10, the communication unit 12 receives the try-on data and transmits the received try-on data to the reception apparatus 30 via the network NW (Step S110).

In the reception apparatus 30, the communication unit 32 receives the try-on data (Step S111). The communication control unit 33*b* acquires the received try-on data. The input/output control unit 33*a* causes the input/output unit 31 to output the acquired try-on data to the display unit 36. The display unit 36 displays the try-on data (Step S112).

As described above, the distribution apparatus 20 according to the present embodiment includes the imaging unit 25, which captures the captured image IM including the try-on object C as a specific object, the object image acquisition unit 23*c*, which acquires the object image Q of the try-on object C from the captured image IM, and the try-on data generation unit 23*d*, which generates the try-on data TD based on the registration avatar and the object image Q.

Further, an information generation method according to the present embodiment includes capturing the captured image IM including the try-on object C as a specific object, acquiring the object image Q of the try-on object C from the captured image IM, and generating the try-on data TD based on the registration avatar and the object image Q.

Further, an information generation program according to the present embodiment causes a computer to execute a process for capturing the captured image IM including the try-on object C as a specific object, a process for acquiring the object image Q of the try-on object C from the captured image IM, and a process for generating the try-on data TD based on the registration avatar and the object image Q.

The above configuration enables the distribution apparatus 20 to generate the try-on data using the registration avatar of the receiver P2 and the object image of the try-on object. Thus, the distributor P1 can try the try-on object on a person other than the distributor P1, or the receiver P2.

In the distribution apparatus 20 according to the present embodiment, the try-on data generation unit 23*d* superimposes the object image Q on the registration avatar to generate the try-on avatar as the try-on data TD as an avatar. Accordingly, it is possible to provide the receiver P2 with the try-on data TD as an avatar.

In the distribution apparatus 20 according to the present embodiment, the try-on data generation unit 23*d* generates the registration image based on the registration avatar and places the registration image at a part corresponding to the object image Q included in the captured image IM to generate the try-on data TD as the captured image IM. Accordingly, it is possible to provide the receiver P2 with the try-on data TD by transmitting the captured image IM.

In the distribution apparatus 20 according to the present embodiment, the object image acquisition unit 23*c* acquires the object image Q based on the movement of the arms of the distributor P1 who holds the try-on object C and captures an image thereof. Accordingly, it is possible to reliably acquire the object image Q in accordance with the action of the distributor P1.

Second Embodiment

Figure 9:
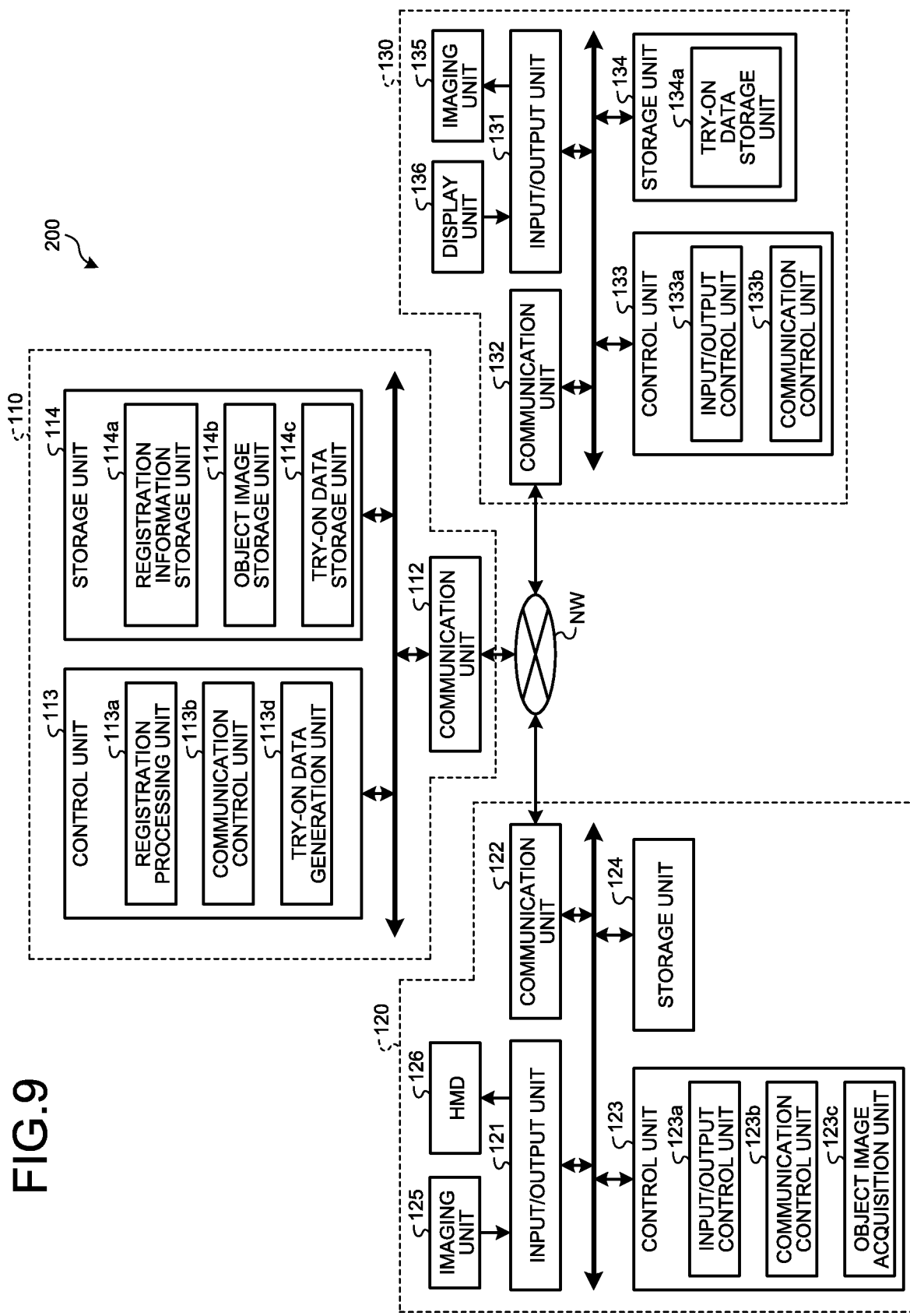
FIG. 9 is a diagram illustrating an example of an information distribution system according to a second embodiment.

FIG. 9 is a diagram illustrating an example of an information distribution system 200 according to a second embodiment. The above first embodiment describes, as an example, the configuration in which the distribution apparatus 20 generates the try-on data. On the other hand, in the information distribution system 200 according to the present embodiment, a server 110 generates try-on data as illustrated in FIG. 9.

A distribution apparatus 120 includes an input/output unit 121, a communication unit 122, a control unit 123, a storage unit 124, an imaging unit 125, and an HMD 126. The input/output unit 121, the communication unit 122, the imaging unit 125, and the HMD 126 are similar to the input/output unit 21, the communication unit 22, the imaging unit 25, and the HMD 26 according to the first embodiment, respectively. In the present embodiment, the storage unit 124 includes no object image storage unit and no try-on data storage unit.

The control unit 123 includes an input/output control unit 123*a*, a communication control unit 123*b*, and an object image acquisition unit 123*c*. In the present embodiment, the control unit 123 includes no try-on data generation unit. The input/output control unit 123*a* and the object image acquisition unit 123*c* are similar to the input/output control unit 23*a* and the object image acquisition unit 23*c* described in the first embodiment, respectively.

When the object image acquisition unit 123*c* has acquired an object image, the communication control unit 123*b* causes the communication unit 122 to transmit the object image to the server 110. The acquired object image is transmitted to the server 110 by this process.

The server 110 includes a communication unit 112, a control unit 113, and a storage unit 114. The communication unit 112 is, for example, capable of communicating information with the distribution apparatus 120 and a reception apparatus 130 via a network NW as with the first embodiment.

The storage unit 114 includes a registration information storage unit 114*a*, an object image storage unit 114*b*, and a try-on data storage unit 114*c*. The registration information storage unit 114*a* stores registration information of the receiver P2 as with the first embodiment. The object image storage unit 114*b* stores the received object image. The try-on data storage unit 114*c* stores try-on data generated by a try-on data generation unit 113*d* (described below).

The control unit 113 includes a registration processing unit 113*a*, a communication control unit 113*b*, and the try-on data generation unit 113*d*. The registration processing unit 113*a* and the communication control unit 113*b* have configurations similar to the configurations of the registration processing unit 13*a* and the communication control unit 13*b* of the first embodiment, respectively. The communication control unit 113*b* acquires the object image received by the communication unit 112, and stores the acquired object image in the object image storage unit 114*b*. When try-on data has been stored in the try-on data storage unit 114*c* (described below), the communication control unit 113*b* causes the communication unit 112 to transmit the try-on data to the reception apparatus 130.

When the object image has been stored in the object image storage unit 114*b*, the try-on data generation unit 113*d* generates try-on data based on the object image and a registration avatar stored in the registration information storage unit 114*a*. The try-on data generation unit 113*d* stores the generated try-on data in the try-on data storage unit 114*c* of the storage unit 114. The process for generating the try-on data by the try-on data generation unit 113*d* is similar to that of the first embodiment.

The reception apparatus 130 includes an input/output unit 131, a communication unit 132, a control unit 133, a storage unit 134, an imaging unit 135, and a display unit 136. The configuration of each of the units of the reception apparatus 130 is similar to that of the reception apparatus 30 described in the first embodiment.

Figure 10:
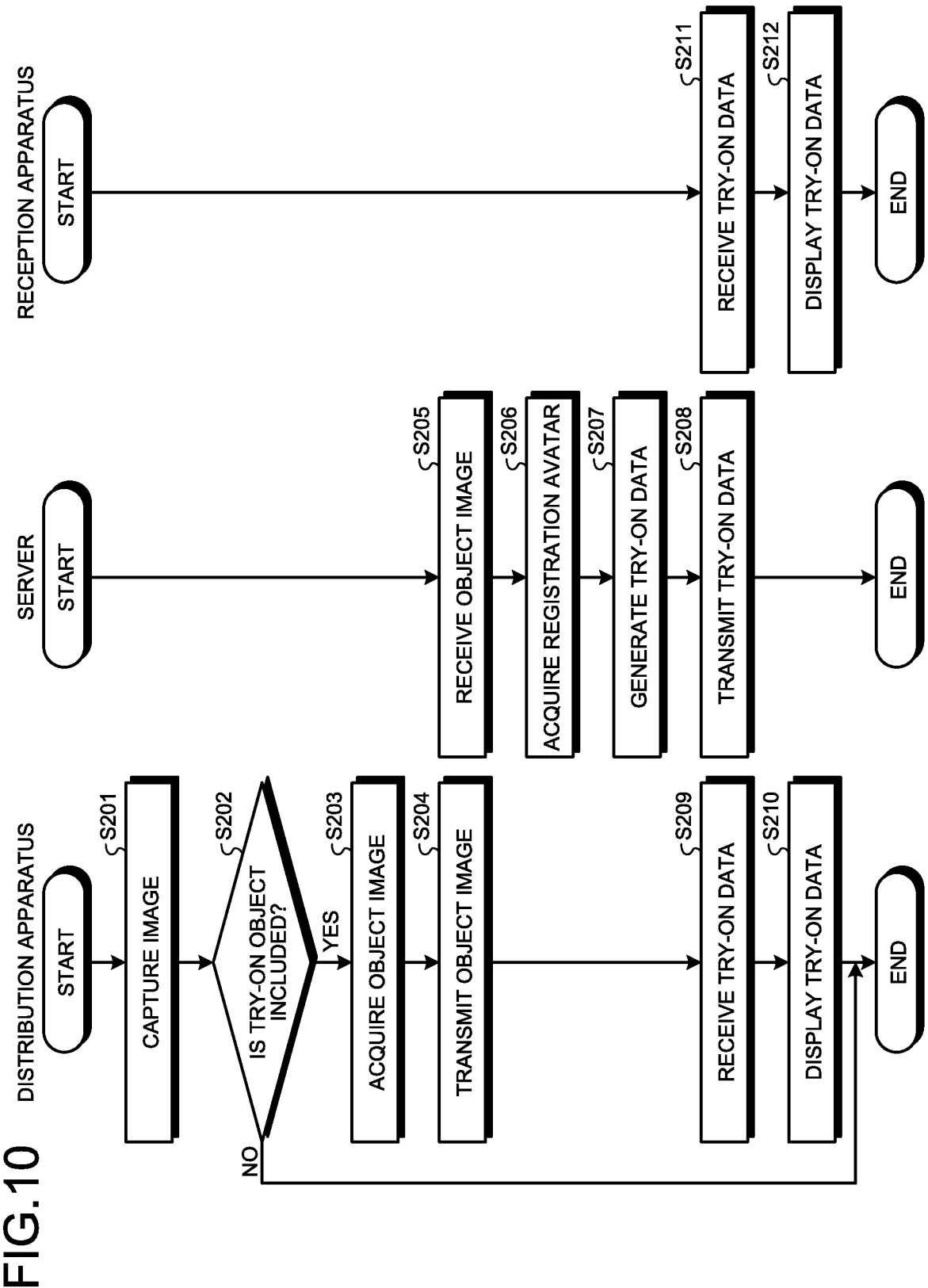
FIG. 10 is a flowchart illustrating an example of the operation of the information distribution system.

FIG. 10 is a flowchart illustrating an example of the operation of the information distribution system 200. As illustrated in FIG. 10, when the distributor P1 captures an image of a try-on object using the imaging unit 125 (Step S201), the object image acquisition unit 123*c* analyzes whether the captured image includes the try-on object in real time (Step S202). When the try-on object has been detected (Yes in Step S202), the object image acquisition unit 123*c* acquires an object image of the try-on object (Step S203). When the object image has been acquired, the communication control unit 123*b* causes the communication unit 122 to transmit the object image to the server 110 via the network NW (Step S204).

In the server 110, the communication unit 112 receives the object image (Step S205). The communication control unit 113*b* acquires the received object image, and stores the acquired object image in the object image storage unit 114*b* of the storage unit 114. When the try-on data generation unit 113*d* has detected that the object image has been stored in the object image storage unit 114*b*, the try-on data generation unit 113*d* acquires a registration avatar stored in the registration information storage unit 114*a* of the storage unit 114 (Step S206). The try-on data generation unit 113*d* generates try-on data of the receiver P2 based on the acquired registration avatar and the object image stored in the object image storage unit 114*b* (Step S207). The try-on data generation unit 113*d* stores the generated try-on data in the try-on data storage unit 114*c* of the storage unit 114. The communication control unit 113*b* causes the communication unit 112 to transmit the try-on data stored in the try-on data storage unit 114*c* to the distribution apparatus 120 and the reception apparatus 130 via the network NW (Step S208).

In the distribution apparatus 120, the communication unit 122 receives the try-on data (Step S209). The communication control unit 123*b* acquires the received try-on data. The input/output control unit 123*a* causes the input/output unit 121 to output the acquired try-on data to the HMD 126. The HMD 126 displays the try-on data (Step S210).

In the reception apparatus 130, the communication unit 132 receives the try-on data (Step S211). A communication control unit 133*b* acquires the received try-on data. An input/output control unit 133*a* causes the input/output unit 131 to output the acquired try-on data to the display unit 136. The display unit 136 displays the try-on data (Step S212).

As described above, the information distribution system 200 according to the present embodiment includes the distribution apparatus 120, the server 110, and the reception apparatus 130. The distribution apparatus 120 includes: the imaging unit 125, which is capable of capturing, in a real space, an image of the try-on object C for the receiver P2 whose registration avatar in a virtual space is previously generated; the object image acquisition unit 123*c*, which acquires the object image Q of the try-on object C form the captured image IM captured by the imaging unit 125; and the communication unit 122, which is capable of transmitting the captured image IM and the object image Q. The server 110 includes: the storage unit 114, which stores the registration avatar; the communication unit 112, which receives the captured image IM and the object image Q transmitted from the distribution apparatus 120; and the try-on data generation unit 113*d*, which generates the try-on data TD based on the registration avatar stored in the storage unit 114 and the received object image Q, and is capable of transmitting the generated try-on data TD from the communication unit 112. The reception apparatus 130 includes: the communication unit 132, which receives the try-on data TD transmitted from the server 110, and the display unit 136, which displays the received try-on data TD. With this configuration, the try-on data TD is generated in the server 110. Thus, it is possible to reduce the burden of the process on the distribution apparatus 120.

Third Embodiment

Figure 11:
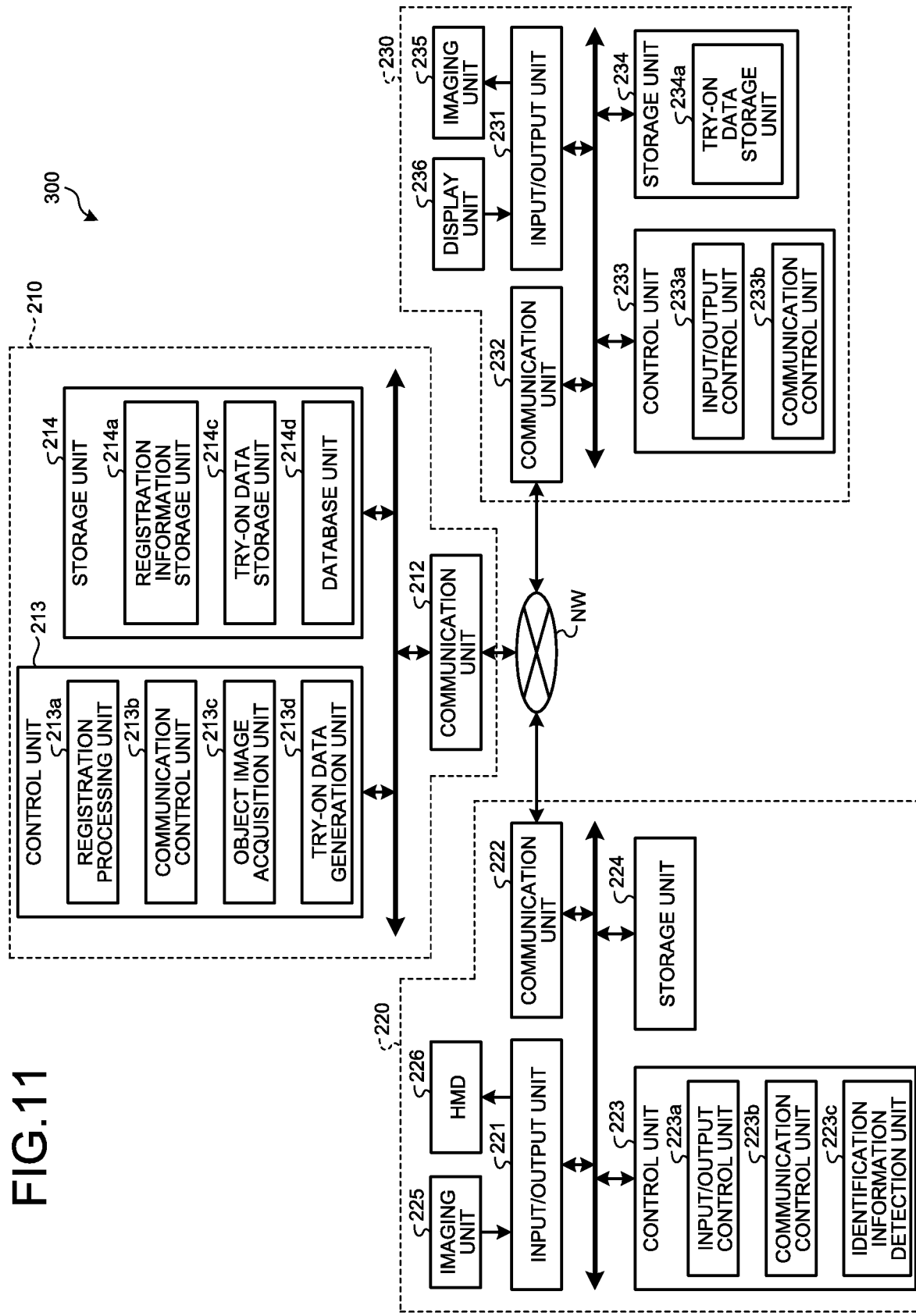
FIG. 11 is a diagram illustrating an example of an information distribution system according to a third embodiment.

FIG. 11 is a diagram illustrating an example of an information distribution system 300 according to a third embodiment. The above second embodiment describes, as an example, the configuration in which the distribution apparatus 120 acquires the object image Q based on the predetermined action of the distributor P1. On the other hand, in the information distribution system 300 according to the third embodiment, a process for acquiring the object image Q differs from that of the second embodiment.

As illustrated in FIG. 11, in the information distribution system 300, a distribution apparatus 220 includes an input/output unit 221, a communication unit 222, a control unit 223, a storage unit 224, an imaging unit 225, and an HMD 226. The input/output unit 221, the communication unit 222, the imaging unit 225, and the HMD 226 are similar to the input/output unit 121, the communication unit 122, the imaging unit 125, and the HMD 126 according to the second embodiment, respectively.

In the present embodiment, identification information such as an augmented reality (AR) marker is previously granted to a try-on object. For example, the identification information can be captured by the imaging unit 225. The control unit 223 includes an identification information detection unit 223*c*. When a captured image captured by the imaging unit 225 includes identification information, the identification information detection unit 223*c* detects the identification information. When the identification information has been detected, a communication control unit 223*b* causes the communication unit 222 to transmit the detected identification information to a server 210 via the network NW.

The server 210 includes a communication unit 212, a control unit 213, and a storage unit 214. The communication unit 212 is, for example, capable of communicating information with the distribution apparatus 220 and a reception apparatus 230 via the network NW as with the second embodiment.

The storage unit 214 includes a registration information storage unit 214*a*, a try-on data storage unit 214*c*, and a database unit 214*d*. The registration information storage unit 214*a* and the try-on data storage unit 214*c* are similar to the registration information storage unit 114*a* and the try-on data storage unit 114*c* of the second embodiment, respectively. The database unit 214*d* stores an object image corresponding to the try-on object with the identification information granted. In the present embodiment, the database unit 214*d* stores the object image corresponding to the try-on object and the identification information of the try-on object in an associated state.

The control unit 213 includes a registration processing unit 213*a*, a communication control unit 213*b*, an object image acquisition unit 213*c*, and a try-on data generation unit 213*d*. The registration processing unit 213*a* and the communication control unit 213*b* are similar to the registration processing unit 113*a* and the communication control unit 113*b* of the second embodiment, respectively. The communication control unit 213*b* acquires the identification information received by the communication unit 212.

The object image acquisition unit 213*c* acquires the object image corresponding to the identification information acquired by the communication control unit 213*b* from the database unit 214*d* of the storage unit 214.

The try-on data generation unit 213*d* generates try-on data based on the acquired object image and a registration avatar stored in the registration information storage unit 214*a*. The try-on data generation unit 213*d* stores the generated try-on data in the try-on data storage unit 214*c* of the storage unit 214. The process for generating the try-on data by the try-on data generation unit 213d is similar to that of the second embodiment.

The reception apparatus 230 includes an input/output unit 231, a communication unit 232, a control unit 233, a storage unit 234, an imaging unit 235, and a display unit 236. The configuration of each of the units of the reception apparatus 230 is similar to that of the reception apparatus 130 described in the second embodiment.

FIG. 12 is a flowchart illustrating an example of the operation of the information distribution system 300. As illustrated in FIG. 12, when the distributor P1 captures an image of a try-on object using the imaging unit 225 (Step S301), the identification information detection unit 223c analyzes whether the captured image includes identification information of the try-on object in real time (Step S302). When the identification information has been detected (Yes in Step S302), the communication control unit 223b causes the communication unit 222 to transmit the detected identification information to the server 210 via the network NW (Step S303).

In the server 210, the communication unit 212 receives the identification information (Step S304). The communication control unit 213b acquires the received identification information. The object image acquisition unit 213c acquires an object image corresponding to the identification information acquired by the communication control unit 213b from the database unit 214d (Step S305). The try-on data generation unit 213d acquires a registration avatar stored in the registration information storage unit 214a of the storage unit 214 (Step S306). The try-on data generation unit 213d generates try-on data of the receiver P2 based on the acquired registration avatar and the object image (Step S307). The try-on data generation unit 213d stores the generated try-on data in the try-on data storage unit 214c of the storage unit 214. The communication control unit 213b causes the communication unit 212 to transmit the try-on data stored in the try-on data storage unit 214c to the distribution apparatus 220 and the reception apparatus 230 via the network NW (Step S308).

In the distribution apparatus 220, the communication unit 222 receives the try-on data (Step S309). The communication control unit 223b acquires the received try-on data. An input/output control unit 223a causes the input/output unit 221 to output the acquired try-on data to the HMD 226. The HMD 226 displays the try-on data (Step S310).

In the reception apparatus 230, the communication unit 232 receives the try-on data (Step S311). A communication control unit 233b acquires the received try-on data. An input/output control unit 233a causes the input/output unit 231 to output the acquired try-on data to the display unit 236. The display unit 236 displays the try-on data (Step S312).

As described above, the information distribution system 300 according to the present embodiment further includes the identification information detection unit 223c, which detects identification information previously granted to the try-on object, and the database unit 214d, which stores the object image corresponding to the try-on object with the identification information granted. When the identification information detection unit 223c has detected identification information, the object image acquisition unit 213c acquires an object image corresponding to the detected identification information from the database unit 214d. Accordingly, it is possible to more easily and reliably acquire the object image by detecting the identification information granted to the try-on object.

The technical scope of the present disclosure is not limited to the above embodiments, and can be appropriately modified without departing from the gist of the disclosure. For example, although the above third embodiment describes, as an example, the configuration that generates the try-on data in the server 210 as with the second embodiment, the present disclosure is not limited thereto. The present disclosure is also applicable to a configuration that generates the try-on data in the distribution apparatus 220 as with the first embodiment.

The present disclosure enables a user to try clothes on a third person other than himself/herself.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information distribution apparatus comprising:
    an imaging unit configured to capture a captured image including a specific object;
    an object image acquisition unit configured to acquire an object image of the specific object from the captured image; and
    a try-on data generation unit configured to generate try-on data based on a registration avatar in a virtual space and the object image, wherein
    the object image acquisition unit is configured to acquire the object image in response to detecting, within the captured image, a scene in which hands of a distributor who holds the specific object and captures the object image of the specific object are present at positions higher than a predetermined height, and the specific object is held with the hands separated by a predetermined distance or greater.

2. The information distribution apparatus according to claim 1, wherein
    the try-on data generation unit is configured to superimpose the object image on the registration avatar to generate a try-on avatar that is the try-on data as an avatar.

3. The information distribution apparatus according to claim 1, wherein
    the try-on data generation unit is configured to generate a registration image based on the registration avatar and place the registration image at a part corresponding to the object image included in the captured image to generate the try-on data as the captured image.

4. The information distribution apparatus according to claim 1, further comprising:
    an identification information detection unit configured to detect identification information previously granted to the specific object; and
    a database unit configured to store the object image corresponding to the specific object with the identification information granted, wherein
    the object image acquisition unit is configured to, in response to detection of the identification information by the detection unit, acquire the object image corresponding to the identification information from the database unit.

5. An information generation method comprising:
    capturing a captured image including a specific object;
    acquiring an object image of the specific object from the captured image;

generating try-on data based on a registration avatar in a virtual space and the object image; and transmitting the try-on data to an information reception apparatus, wherein the acquiring comprises acquiring the object image in response to detecting, within the captured image, a scene in which hands of a distributor who holds the specific object and captures the object image of the specific object are present at positions higher than a predetermined height, and the specific object is held with the hands such that there is a predetermined distance or greater between the hands.

6. A non-transitory computer-readable storage medium storing an information generation program configured to cause a computer to execute a method, the method comprising:

capturing a captured image including a specific object;

acquiring an object image of the specific object from the captured image; and generating try-on data based on a registration avatar in a virtual space and the object image, wherein the acquiring comprises acquiring the object image in response to detecting, within the captured image, a scene in which the hands of a distributor who holds the specific object and captures the object image of the specific object are present at positions higher than a predetermined height, and in which the specific object is held with the hands separated by a predetermined distance or greater.

* * * * *